June 11, 1940.  H. W. PORTER ET AL  2,203,926
POLE PRUNER AND LIKE TOOLS
Filed April 9, 1937
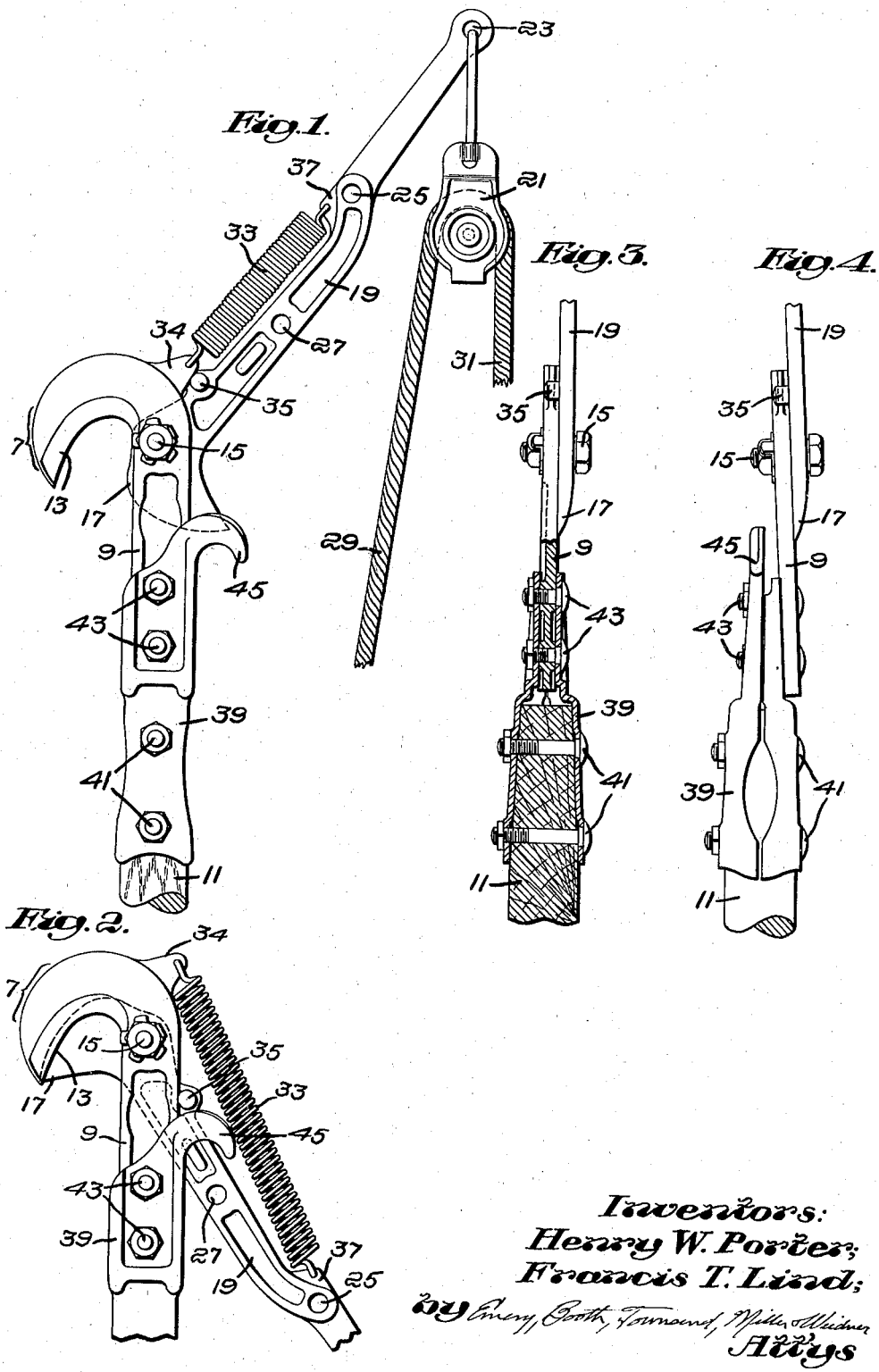
Inventors:
Henry W. Porter;
Francis T. Lind;
by Emery, Booth, Townsend, Miller & Widner
Attys Patented June 11, 1940

2,203,926

UNITED STATES PATENT OFFICE 2,203,926

POLE PRUNER AND LIKE TOOLS

Henry W. Porter, Brookline, and Francis T. Lind, Everett, Mass., assignors to H. K. Porter, Inc., Everett, Mass., a corporation of Massachusetts Application April 9, 1937, Serial No. 135,960

4 Claims. (Cl. 30—249)

This invention relates to cutting tools and in its more particular aspect to a pruning instrument of the type which is mounted upon a long staff or pole for operation by means of a pull cord or the like to trim distant parts of trees. Although certain features of the invention may be utilized in tools of somewhat differing construction for application to specifically different uses, it will be convenient in the following description to refer to the subject matter under consideration as a pole pruner. In accordance with our invention we provide a construction for a cutting tool of this type having particular advantages in manufacture and in use, as will appear more fully to those skilled in the art from the following description of an illustrative embodiment thereof shown by way of example in the accompanying drawing, wherein—

Fig. 1 is a fragmentary side elevation of a pole pruner illustrative of the invention;

Fig. 2 is a similar view showing the jaws closed;

Fig. 3 is a part section, part elevation as seen from the right of Fig. 1; and

Fig. 4 is an elevation from a similar point of view showing the parts assembled in a different arrangement.

Referring to the drawing, the cutting tool there shown comprises two interpivoted levers which cooperate in the manner of shears. One lever 7 forming a relatively stationary jaw of the tool may have the general form of an inverted J with the stem 9 thereof mounted as a substantially axial continuation of the staff or pole 11, while the throat of the J faces downward to form a hook-like work-engaging portion which in the example of the invention shown is provided with a sharp cutting edge 13. On a pivot 15 adjacent the upper end of the stem 9 is mounted a cooperating lever, one portion of which forms the blade 17 having a sharp cutting edge adapted to sweep across the throat of the J and cooperating in the manner of shears with the sharpened edge 13 and another portion of which forms an operating arm 19 extending generally at the opposite side of the pivot. The contour and relative arrangement of the blades 13 and 17 preferably are as more fully described in the patent of Porter and Geddes, No. 2,090,228, dated August 17, 1937. A detailed description is unnecessary, but it may be noted that the sharpened edges of the blades present in all open positions thereof an open throat extending without substantial restriction from their distal ends to the point of intersection of the work-engaging edges and that said edges have inner portions which in the open position of the tool shown in Fig. 1 lie in a circular arc and extend from the extremities of the arc as relatively flat, concave and convex curves of a spiral nature, defining between them a substantially constant angle of intersection throughout closing movement.

The lever arm 19 may be operated in any suitable manner. We have herein shown the runner pulley 21, which may be suspended from any one of the openings 23, 25 and 27 in the arm 19 according to the mechanical leverage desired and receives a cord having a standing part 29 which may be suitably secured to the pole 11 and an operating part or fall 31. The lever may thus be drawn downwardly to the position of Fig. 2 and is returned to the normal position of Fig. 1 by means of a suitable tension spring 33. Herein the lever 7 is provided at the back of the J where it curves into the stem portion 9 with a projecting lug 34 forming a stop cooperating with a pin 35 projecting from the arm 19. The terminal end of the arm is upwardly offset, as indicated at 37, and there is thus provided a sort of pocket between the projection 33 and the offset at 37 in which the spring 33 may be received so that a substantially smooth bounding contour is provided for the upper portion of the tool in the position of Fig. 1 without abrupt projecting parts likely to become entangled in the branches of the tree.

We provide novel means for mounting the stationary lever on the pole 11 which herein takes the form of a thimble or ferrule 39 divided diametrically into two halves. The lower portions of the thimble fit about the end of the pole 11 and may be secured thereto by the bolts 41, while the upwardly projecting extensions thereof between the pole are adapted to receive between them the stem 9 of the J-shaped lever to be secured by bolts 43. That half of the thimble which in the drawing lies to the left, viewing Figs. 3 and 4, or at the rearward side of Fig. 1, has its lateral outer face formed as a seat against which the stem 9 may be applied, as shown in Fig. 4, to be secured by means of the bolts 43 substantially in overhanging relation at one side of the pole. This alternative arrangement of the parts is of advantage under certain conditions when it is desired to cut off branches close to the part from which they project.

Referring to Fig. 1, it will be seen that in the open position of the parts the distal end of the blade 17 projects to the right beyond the back of the stem 9 of the J-shaped stationary lever and if that lever is to have such a simple and economically manufactured form as is shown, such projection is inevitable. To protect the cutting edge of this movable blade and to prevent it from fouling objects when the pruner is advanced to the work, one of the halves of the thimble 39 may be provided with a rearwardly extending projection 45 which masks this portion of the blade, as clearly shown in Fig. 1. This projection 45 is preferably made as shown in the form of a downwardly facing hook or grapple, which is useful as a crook, for example, to move branches or to pull sling ropes as used by pruners from among the branches and may also serve as a suspending hook for the tool as a whole. In the tool illustrated the work-engaging edge 13 is sharpened and cannot well be used as a manipulating crook, while there would moreover be danger of the blade 17 marring branches which it was not desired to cut.

We are aware that the invention may be embodied in other specific forms without departing from the spirit or essential attributes thereof, and we therefore desire the present embodiment to be considered in all respects as illustrative and not restrictive; reference being had to the appended claims rather than to the foregoing description to indicate the scope of the invention.

We claim:

1. A tool of the class described comprising a lever of general J form mounted on a handle to present the throat of the J as a downwardly opening, work-engaging portion, a cooperating lever pivoted adjacent the upper end of the stem of the J and having an edged portion shaped to effect in cooperation with said work-engaging portion a cut propagated progressively from the throat of the J toward the extremity of the short arm thereof, said edged portion projecting outwardly beyond the back of the J in open position of the parts, the tool embodying a downwardly facing grapple at the back of the J positioned to mask the end of said edged portion in said open position.

2. A tool of the class described comprising a lever of general J form mounted on a handle to present the throat of the J as a downwardly opening, work-engaging portion, a cooperating lever pivoted adjacent the upper end of the stem of the J and having an edged portion shaped to effect in cooperation with said work-engaging portion a cut propagated progressively from the throat of the J toward the extremity of the short arm thereof, said edged portion projecting outwardly beyond the back of the J in open position of the parts, the mounting of the lever comprising a thimble at the extremity of the handle to which the shank of the J is secured and which has a lateral projection positioned to lie at the back of the J and to mask the end of said edged portion in said open position.

3. A tool of the class described comprising a lever of general J form mounted on a handle to present the throat of the J as a downwardly opening, work-engaging portion, a cooperating lever pivoted adjacent the upper end of the stem of the J and having an edged portion adapted to sweep across the throat of the J to effect a cut in cooperation with said work-engaging portion and an operating portion projecting in a direction extending rearwardly from the back of the J, the cooperating lever having its terminal upwardly offset, and a tension spring interposed between the offset terminal and the back of the J.

4. A tool of the class described comprising a lever of general J form mounted on a handle to present the throat of the J as a downwardly opening, work-engaging portion, a cooperating lever pivoted adjacent the upper end of the stem of the J and having an edged portion adapted to sweep across the throat of the J to effect a cut in cooperation with said work-engaging portion and an operating portion projecting in a direction extending rearwardly from the back of the J, the cooperating lever having its terminal upwardly offset, a stop projection at the back of the J cooperating with the operating portion, and a tension spring substantially received within the space defined by said projection and the offset terminal.

HENRY W. PORTER.
FRANCIS T. LIND.